(12) United States Patent
Park et al.

(10) Patent No.: US 11,615,787 B2
(45) Date of Patent: Mar. 28, 2023

(54) DIALOGUE SYSTEM AND METHOD OF CONTROLLING THE SAME

(71) Applicants: HYUNDAI MOTOR COMPANY, Seoul (KR); KIA MOTORS CORPORATION, Seoul (KR)

(72) Inventors: Youngmin Park, Seoul (KR); Seona Kim, Seoul (KR); Jeong-Eom Lee, Yongin-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 135 days.

(21) Appl. No.: 17/116,082

(22) Filed: Dec. 9, 2020

(65) Prior Publication Data

US 2021/0327415 A1 Oct. 21, 2021

(30) Foreign Application Priority Data

Apr. 21, 2020 (KR) .......... 10-2020-0048281

(51) Int. Cl.
| | |
|---|---|
| *G10L 15/00* | (2013.01) |
| *G10L 15/197* | (2013.01) |
| *G10L 15/16* | (2006.01) |
| *G10L 15/22* | (2006.01) |
| *G10L 15/18* | (2013.01) |

(52) U.S. Cl.
CPC ............ *G10L 15/197* (2013.01); *G10L 15/16* (2013.01); *G10L 15/1815* (2013.01); *G10L 15/22* (2013.01)

(58) Field of Classification Search
None
See application file for complete search history.

(56) References Cited

U.S. PATENT DOCUMENTS

| | | | |
|---|---|---|---|
| 9,875,081 B2* | 1/2018 | Meyers | G10L 15/00 |
| 2017/0140761 A1* | 5/2017 | Seeker-Walker | G10L 15/18 |
| 2018/0210703 A1* | 7/2018 | Meyers | G10L 15/32 |
| 2020/0125603 A1* | 4/2020 | Ha | G06F 16/3329 |
| 2020/0279279 A1* | 9/2020 | Chaudhuri | G10L 25/63 |

* cited by examiner

*Primary Examiner* — Satwant K Singh
(74) *Attorney, Agent, or Firm* — Morgan, Lewis & Bockius LLP (57) ABSTRACT

A dialogue system includes a processor configured to: generate a meaning representation corresponding to an input sentence by performing Natural Language Understanding on the input sentence, generate an output sentence corresponding to the input meaning representation based on Recurrent Neural network (RNN), and determine whether the input sentence cannot be processed using the natural language generator. The processor calculates a parameter representing a probability of outputting the input sentence when the meaning representation corresponding to the input sentence is input to the natural language generator, and determines whether the input sentence cannot be processed based on the calculated parameter.

14 Claims, 9 Drawing Sheets

DIALOGUE SYSTEM AND METHOD OF CONTROLLING THE SAME

CROSS-REFERENCE TO RELATED APPLICATION

This application is based on and claims the benefit of priority to Korean Patent Application No. 10-2020-0048281, filed on Apr. 21, 2020 in the Korean Intellectual Property Office, the disclosure of which is incorporated by reference herein in its entirety.

TECHNICAL FIELD

The present disclosure relates to a dialogue system and a controlling method of a dialogue system capable of providing a service corresponding to a user's speech.

BACKGROUND

When an intention of a user's speech entered in a dialogue system is a request for a service not supported by the dialogue system, or when the user's speech is a meaningless speech, such a user speech corresponds to an OOD (Out-of-Domain) speech.

If the input user speech corresponds to an OOD speech, the dialogue system must provide an appropriate response corresponding to OOD speech, such as notifying that the system cannot provide the service requested by a user or providing an alternative service.

Therefore, in a dialogue system, OOD detection, which determines whether a user's speech corresponds to an OOD speech, is a very important function. OOD detection is mainly based on rules or machine learning. In rule-based OOD detection, the accuracy of OOD detection is determined by how the rule is constructed. In order to obtain high accuracy, it takes a lot of time and cost to establish a rule for the OOD detection.

A machine learning-based OOD detection requires time and cost for additional data construction because sentences corresponding to the OOD speech must be separately collected for learning.

SUMMARY

It is an aspect of the present disclosure to provide a dialogue system and a dialogue system control method to improve service quality at low cost without constructing additional OOD data by performing OOD detection using a natural language generator that generates a system response for a user speech.

In accordance with embodiments of the present disclosure, a dialogue system includes a processor configured to: generate a meaning representation corresponding to an input sentence by performing Natural Language Understanding on the input sentence, generate an output sentence corresponding to the input meaning representation based on Recurrent Neural network (RNN). determine whether the input sentence cannot be processed using the natural language generator, calculate a parameter representing a probability of outputting the input sentence when the meaning representation corresponding to the input sentence is input r, and determine whether the input sentence cannot be processed based on the calculated parameter.

The natural language generator may include a plurality of cells outputting words corresponding to the input meaning representation.

Each of the plurality of cells may generate a probability distribution for a plurality of pre-stored words, and input a word included in the input sentence among the plurality of words into the next cell in response to the input.

The determiner may calculate the parameter based on an output probability of a word included in the input sentence from the generated probability distribution.

Each of the plurality of cells may generate a ranking distribution fora plurality of pre-stored words and inputs a word included in the input sentence among the plurality of words into the next cell in response to an input.

The determiner may calculate the parameter based on the output ranking of words included in the input sentence in the generated ranking distribution.

The determiner may determine that the input sentence is a sentence that cannot be processed when the parameter is less than reference value.

The input sentence that cannot be processed may be an Out-of-domain (OOD) sentence.

Each of the plurality of cells may generate a probability distribution or rank distribution for a plurality of pre-stored words, and input the word having the highest output probability or output priority among the plurality of words into the next cell in response to input when the input sentence is a sentence that can be processed.

The natural language generator may generate an output sentence consisting of words output from each of the plurality of cells.

In accordance with embodiments of the present disclosure, a controlling method of a dialogue system, the method may comprise generating a meaning representation corresponding to an input sentence by performing Natural Language Understanding on the input sentence; and determining whether the input sentence cannot be processed using a processor which generate an output sentence corresponding to the input meaning representation based on Recurrent Neural network (RNN), wherein the determining whether the input sentence cannot be processed may include calculating a parameter representing a probability of outputting the input sentence when the meaning representation corresponding to the input sentence is input to the natural language generator, and determining whether the input sentence annot be processed based on the calculated parameter.

The natural language generator may include a plurality of cells outputting words corresponding to the input meaning representation.

Determining whether the input sentence is a sentence that cannot be processed may include generating a probability distribution for a plurality of pre-stored words, and inputting a word included in the input sentence among the plurality of words into the next cell in response to the input.

Determining whether the input sentence is a sentence that cannot be processed may include calculating the parameter based on an output probability of a word included in the input sentence from the generated probability distribution.

Determining whether the input sentence is a sentence that cannot be processed may include generating a ranking distribution for a plurality of pre-stored words in response to the input by the each of the plurality of cells and inputting a word included in the input sentence among the plurality of words into the next cell in response to an input.

Determining whether the input sentence is a sentence that cannot be processed may include, calculating the parameter based on the output ranking of words included in the input sentence in the generated ranking distribution.

Determining whether the input sentence is a sentence that cannot be processed may include, determining that the input sentence is a sentence that cannot be processed when the parameter is less than reference value.

The input sentence that cannot be processed may be an Out-of-domain (OOD) sentence.

The method may further include generating a probability distribution or rank distribution for a plurality of pre-stored words by each of the plurality of cells, and inputting the word having the highest output probability or output priority among the plurality of words into the next cell in response to input when the input sentence is a sentence that can be processed.

The method may further include generating an output sentence consisting of words output from each of the plurality of cells with the highest output probability or the highest output rank when the input sentence is a sentence that can be processed.

BRIEF DESCRIPTION OF THE DRAWINGS

These and/or other aspects of the disclosure should become apparent and more readily appreciated from the following description of embodiments, taken in conjunction with the accompanying drawings of which.

DETAILED DESCRIPTION OF THE EMBODIMENTS

Configurations shown in the embodiments and drawings described herein show various examples of the disclosure. There may be various modifications that can replace the embodiments and drawings of the present specification at the time of filing of the present application.

The terminology used herein is for the purpose of describing particular embodiments only and is not intended to be limiting of the disclosure. Singular expressions include plural expressions unless the context clearly indicates otherwise. As used herein, the terms "comprise", or "have" are intended to designate that the features, numbers, steps, actions, components, parts, or combinations thereof described in the specification are present. The terms do not preclude the existence or addition of one or more other features or numbers, steps, operations, components, parts or combinations thereof in advance.

In addition, terms such as "~part", "~group", "~block", "~member", "~module" may refer to a unit for processing at least one function or operation. For example, the terms may refer to at least one hardware processed by at least one piece of hardware such as a field-programmable gate array (FPGA)/application specific integrated circuit (ASIC), at least one software stored in a memory, or a processor.

In addition, ordinal numbers such as "first" and "second" used before the components described herein are merely used to distinguish the components from each other. The ordinal numbers used before the components are not used to specify the order of connection between these components and the order of use thereof. The ordinal numbers do not have a different meaning, such as priority.

The references attached to the steps are used to identify the steps. These references do not indicate the order between the steps. Each step is performed in a different order than the stated order unless the context clearly indicates a specific order.

On the other hand, the disclosed embodiments may be implemented in the form of a recording medium for storing instructions executable by a computer. Instructions may be stored in the form of program code and, when executed by a processor, may generate a program module to perform the operations of the disclosed embodiments. The recording medium may be implemented as a computer-readable recording medium.

Computer-readable recording media may include all kinds of recording media having stored thereon instructions which can be read by a computer. For example, there may be a read only memory (ROM), a random-access memory (RAM), a magnetic tape, a magnetic disk, a flash memory, an optical data storage device, and the like.

Further, when an element in the written description and claims is described as being "for" performing or carry out a stated function, step, set of instructions, or the like, the element may also be considered as being "configured to" do so.

Hereinafter, an embodiment of a dialogue system, a dialogue processing method are described in detail with reference to the accompanying drawings.

The dialogue system according to an embodiment of the present disclosure is a device that analyzes a user's speech to understand the user's intention and provides a service suitable for the user's intention. The dialogue system can make the user feel as if they are talking with the dialogue system by outputting the system response to provide a service suitable for the user's intention. The system response may include an answer to a user's question, a question to confirm the user's intention, and a guide for a service to be provided.

Figure 1:
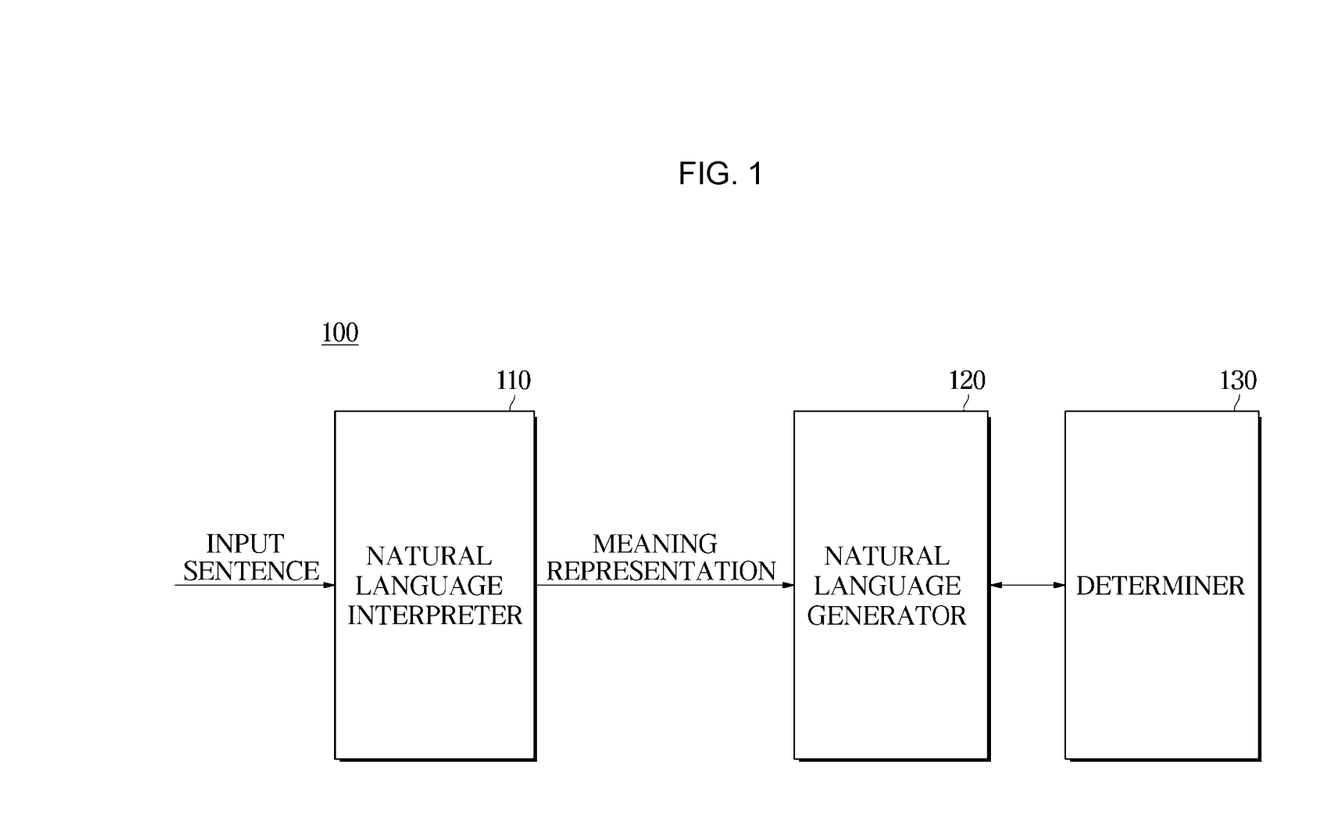
FIG. 1 is a control block diagram of a dialogue system according to an embodiment of the present disclosure.

FIG. 1 is a control block diagram of a dialogue system according to an embodiment of the present disclosure.

Referring to FIG. 1, the dialogue system 100 according to an embodiment of the present disclosure includes a Natural language interpreter 110 which generates a meaning representation corresponding to the input sentence by performing natural language understanding on the input sentence, a natural language generator 120 that generates an output sentence corresponding to the input meaning representation based on a recurrent neural network (RNN), and a determiner 130 that determines whether the input sentence is a sentence that cannot be processed using the natural language generator 120.

The dialogue system 100 according to an exemplary embodiment may include at least one memory storing a program that performs an operation described later and related data, and at least one processor that executes the stored program.

Components in this embodiment are not classified based on physical location or configuration, but based on operation, the natural language interpreter 110, the natural language generator 120, and the determiner 130 may each use separate memories and processors, and some or all of them may share a memory and a processor.

The dialogue system 100 according to an embodiment of the present disclosure may be implemented as a server, and in this case, the components 110, 120, and 130 of the dialogue system 100 may be provided in the server. However, some of the components 110, 120, and 130 of the dialogue system 100 may be provided in a user terminal that connects the user and the dialogue system 100.

For example, when the user terminal is a vehicle, some of the components of the dialogue system 100 may be provided in the vehicle, and when the user terminal is a mobile device such as a smartphone, an AI speaker, or a PC, some of the components of the dialogue system 100 may be provided in the mobile device, the AI speaker, or the PC.

Alternatively, it is possible for the user to download and use a program that performs some functions among the components of the dialogue system 100 to the user terminal.

The input sentence inputted to the natural language interpreter 110 is converted from a user speech inputted into a microphone into text, and may be provided from a user terminal or may be provided from a speech recognizer provided in the dialogue system 100.

Figure 2:
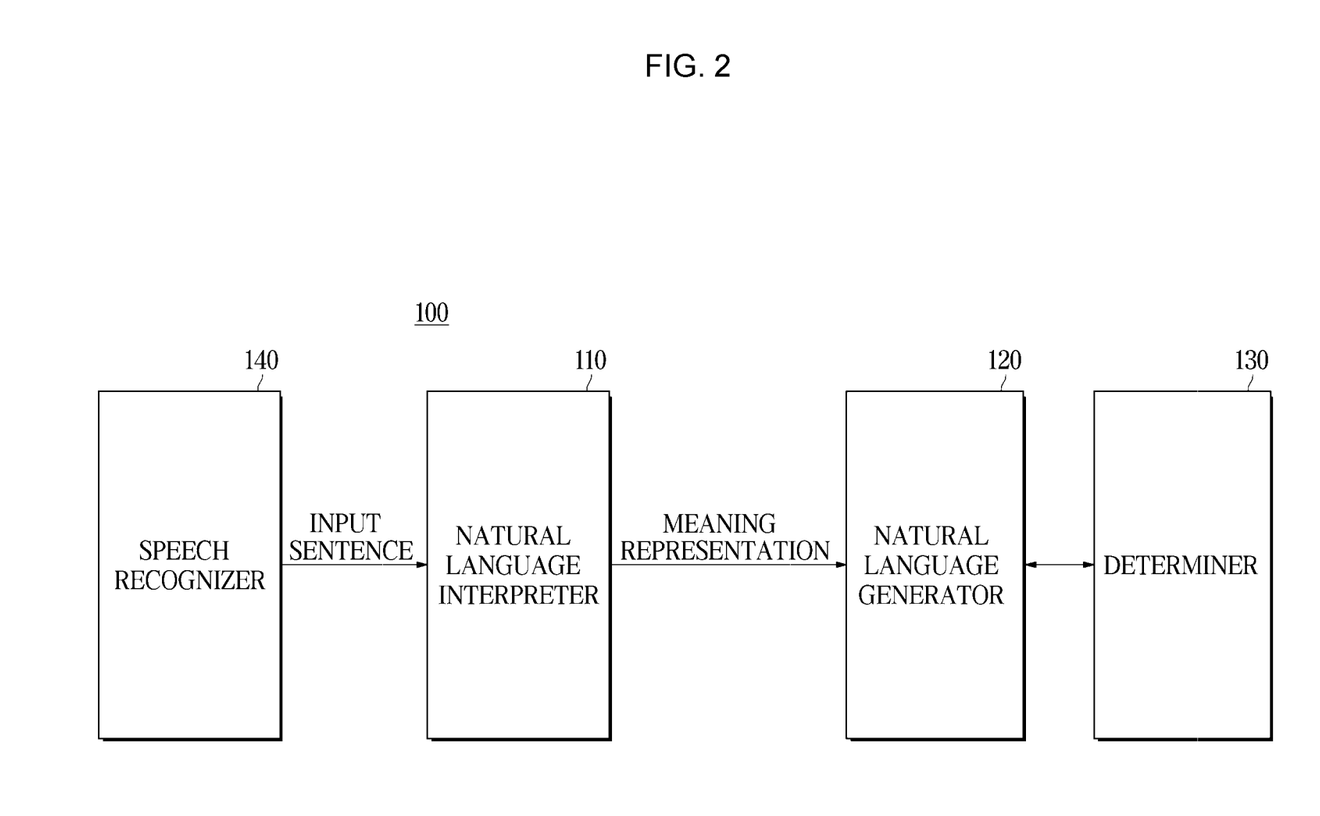
FIG. 2 is a control block diagram of a dialogue system further including a speech recognizer according to an embodiment of the present disclosure.
Figure 3:
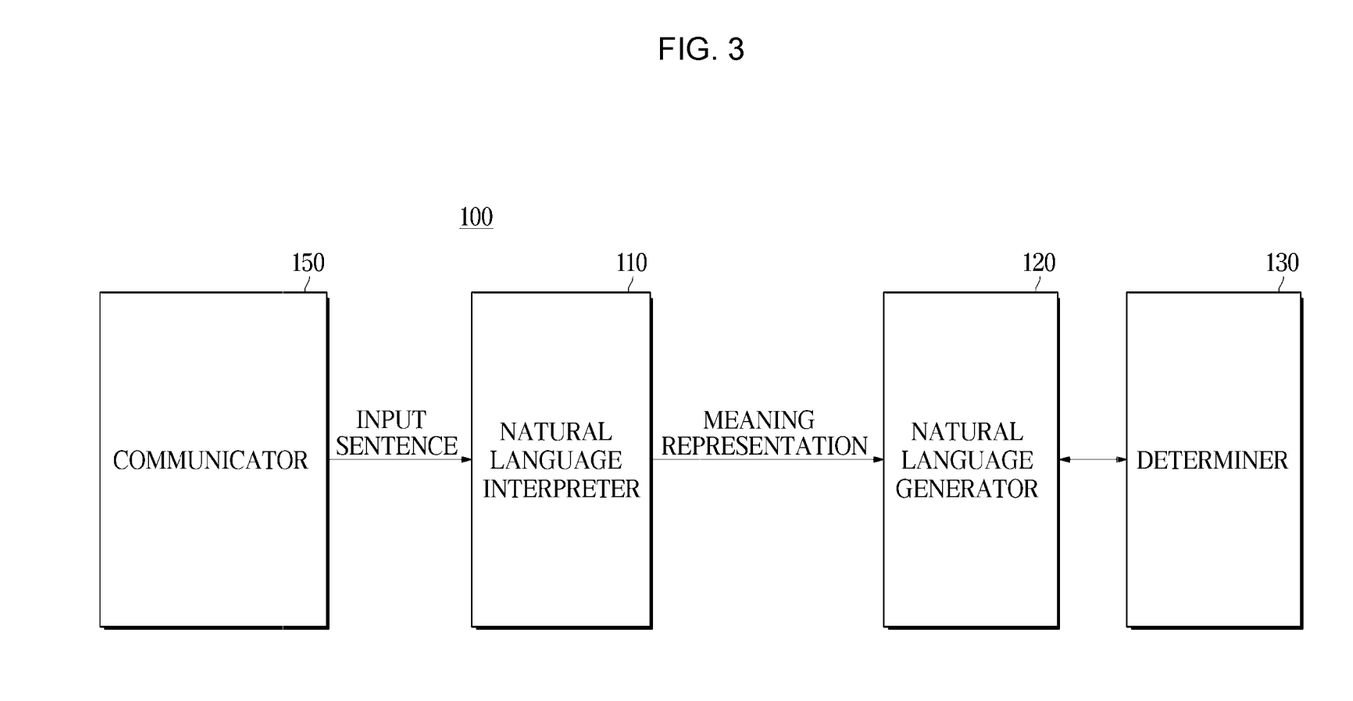
FIG. 3 is a control block diagram of a dialogue system further including a communicator according to an embodiment of the present disclosure.

FIG. 2 is a control block diagram of a dialogue system further including a speech recognizer according to an embodiment of the present disclosure. FIG. 3 is a control block diagram of a dialogue system further including a communicator according to an embodiment of the present disclosure.

Referring to FIG. 2, the dialogue system 100 according to an embodiment of the present disclosure may further include a speech recognizer 140 for converting a user speech into text.

The speech recognizer 140 may convert a user speech transmitted from a user terminal into text by applying a speech recognition algorithm or a Speech To Text (STT) algorithm.

For example, the speech recognizer 140 may extract a feature vector of a speech signal corresponding to a user speech by applying Feature vector extraction techniques such as Cepstrum, Linear Predictive Coefficient (LPC), Mel Frequency Cepstral Coefficient (MFCC), or Filter Bank Energy.

In addition, a recognition result can be obtained by comparing the extracted feature vector with the trained reference pattern. To this end, an acoustic model for modeling and comparing signal characteristics of speech and a language model for modeling a linguistic order relationship such as words or syllables corresponding to a recognized vocabulary may be used.

The speech recognizer 140 can use any of the known speech recognition techniques to convert the user's speech into text.

The speech recognizer 140 converts the user's speech to text and inputs it into the natural language interpreter 110. In an embodiment to be described later, a user speech converted to text will be referred to as an input sentence.

A microphone into which a user's speech is input and a speaker that outputs a system response may be provided in a user terminal such as a vehicle, a mobile device, or a PC, and the user terminal may be connected to the dialogue system 100 through wireless communication. Referring to FIG. 3, the dialogue system 100 may further include a communicator 150 capable of exchanging data with a user terminal through wireless communication.

The user speech input through the microphone may be transmitted to the communicator 150 of the dialogue system 100.

A speech recognizer that recognizes a user's speech and converts it into text may be provided in the user terminal. In this case, the communicator 150 may receive an input sentence from the user terminal, and the received input sentence may be input to the natural language interpreter 110.

The natural language interpreter 110 can analyze the input sentence to understand the user intention included in the users speech. To this end, the natural language interpreter 110 may apply machine learning or deep learning-based natural language understanding to input sentences.

Specifically, the natural language interpreter 110 converts the input string into a morpheme sequence by performing morpheme analysis on the user's speech in text form. In addition, the conversation manager 120 may recognize the entity name from the user's speech. The entity name is a proper noun such as a person's name, place name, organization name, time, date, currency, etc., and entity name recognition is the task of identifying the entity name in a sentence and determining the type of the identified entity name. The meaning of the sentence can be grasped by extracting important keywords from the sentence through entity name recognition.

The natural language interpreter 110 can analyze the speech behavior of the user's speech. Speech act analysis is the task of analyzing the intention of the user's speech, and is to grasp the intention of the speech such as whether the user is asking a question, making a request, responding, or expressing a simple emotion.

The natural language interpreter 110 may generate a meaning representation used to generate a system response corresponding to a user intention or to provide a service corresponding to the user intention, based on the analysis result of the input sentence.

The meaning representation in conversation processing may be a result of understanding natural language or may be an input of natural language generation. For example, the natural language interpreter 110 may analyze the user's speech to generate a meaning representation that expresses the user's intention, and may generate a meaning representation corresponding to the next system response in consideration of the conversation flow and situation. In some cases, the term dialogue act may be used instead of meaning representation.

The meaning representation may include information, such as a speech act, a data type, and a data value corresponding thereto for generating a system response corresponding to the user's intention.

The meaning representation may be a set of various meaning representation tags. For example, the meaning representation of the natural language sentence "Please guide me to Seoul Station" includes a speech act tag called "request", a data type tag called "navigation", and a data value tag of "Seoul Station" corresponding to the data type tag.

The natural language generator 120 may generate a sentence (hereinafter, referred to as an output sentence) to be output as a system response based on the meaning representation output from the natural language interpreter 110, and the generated sentence may be synthesized as a voice signal by a text to speech (TTS) engine provided in the result processor 160 (see FIG. 7) and output through a speaker provided in the user terminal.

Figure 4:
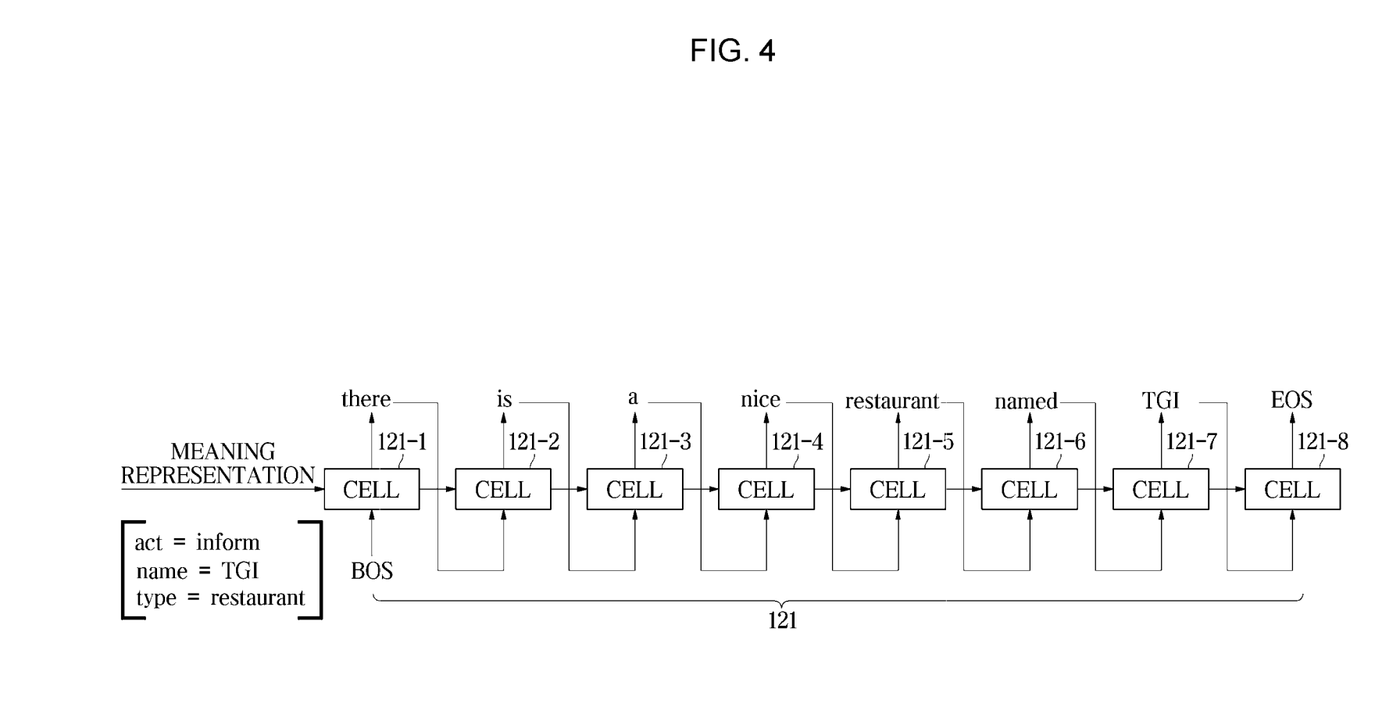
FIG. 4 is a structural diagram illustrating a natural language generation algorithm performed in a natural language generator of a dialogue system and an example of applying the algorithm according to an embodiment of the present disclosure.

FIG. 4 is a structural diagram illustrating a natural language generation algorithm performed in a natural language generator of a dialogue system and an example of applying the algorithm according to an embodiment of the present disclosure.

The natural language generator 120 may generate an output sentence corresponding to a meaning representation input from the natural language interpreter 110. The natural language generator 120 may generate an output sentence based on a deep learning technique using a deep neural network.

Deep neural networks used for natural language generation may include at least one of Recurrent Neural Network (RNN), Bi-directional RNN (BRNN), Long Short Term Memory (LSTM), Bi-directional LSTM (BLSTM), Gated Recurrent Unit (GRU), and Bi-directional GRU (BGRU).

RNN is characterized by using the hidden state of the past time step and the system input value of the current time step to calculate the new hidden state. For example, in the generation of natural language using an RNN, an output value outputted in response to a specific input value can be used as an input value in the next time step, and the input value and output value at this time can include words constituting a sentence. By repeating this process, words constituting the output sentence can be generated in a certain order.

Referring to the example of FIG. 4, the meaning representation, which is an analysis result of the natural language interpreter 110, is input as an initial hidden layer of the RNN-based natural language generator 120, and the natural language generator 120 may include a plurality of cells 121 that output words corresponding to the input meaning representation. The plurality of cells 121 may include at least one of RNN cells such as Long-Short Term Memory (LSTM) and Gated Recurrent Unit (GRU).

Each of the plurality of cells 121 may generate a probability distribution for a plurality of pre-stored words in response to an input. The plurality of pre-stored words may be words registered in the dictionary of the dialogue system 100, and the probability distribution for a plurality of words represents a probability that each word, which is a probability that each word matches an input of a corresponding cell, is output from a corresponding cell. In an embodiment to be described later, the probability for each word in the probability distribution for a plurality of words will be referred to as an output probability.

Among the plurality of words, the word having the highest output probability becomes the output of the cell 121 of the current time step, and the output of the cell 121 of the current time step becomes the input of the cell 121 of the next time step.

That is, each of the plurality of cells 121 may input a word output from a cell in a previous time step, and a word outputted by itself may be an input to a cell in the next time step.

In the example of FIG. 4, the meaning representation [act=inform/name=TGI/type=restaurant], which is an output of the natural language interpreter 110, is input as an initial hidden layer of the natural language generator 120. BOS (Begin of Sentence) indicating the start of a sentence may be an input of the first cell 121-1, and an output of the first cell 121-1 may be "there". That is, among a plurality of words stored in the dictionary of the dialogue system 100, the word with the highest output probability in the first cell 121-1 is "there".

"There", which is an output of the first cell 121-1, becomes an input of the second cell 121-2, and the second cell 121-2 may output "is". That is, among a plurality of words stored in the dictionary of the dialogue system 100, the word with the highest output probability in the second cell 121-2 is "is".

"Is", which is an output of the second cell 121-2, becomes an input of the third cell 121-3, and the third cell 121-3 may output "a". That is, among a plurality of words stored in the dictionary of the dialogue system 100, the word with the highest output probability in the third cell 121-3 is "a".

"A", which is an output of the third cell 121-3, may be an input of the fourth cell 121-4, and the fourth cell 121-4 may output "nice". That is, among a plurality of words stored in the dictionary of the dialogue system 100, the word with the highest output probability in the fourth cell 121-4 is "nice".

"Nice", which is the output of the fourth cell 121-4, becomes an input of the fifth cell 121-5, and the fifth cell 121-5 may output "restaurant". That is, among the plurality of words stored in the dictionary of the dialogue system 100, the word with the highest output probability in the fifth cell 121-5 is "restaurant".

"Restaurant", which is an output of the fifth cell 121-5, becomes an input of the sixth cell 121-6, and the sixth cell 121-6 may output "named". That is, the word with the highest output probability in the sixth cell 121-6 among the plurality of words stored in the dictionary of the dialogue system 100 is "named".

"Named", which is an output of the sixth cell 121-6, becomes an input of the seventh cell 121-7, and the seventh cell 121-7 may output "TGI". That is, among a plurality of words stored in the dictionary of the dialogue system 100, the word with the highest output probability in the seventh cell 121-7 is "TGI".

"TGI", which is an output of the seventh cell 121-7, becomes an input of the eighth cell 121-8, and the eighth cell 121-8 may output an End of Sentence (EOS). That is, EOS has the highest output probability in the eighth cell 121-8.

In the case of the example of FIG. 4, the output sentence of the natural language generator 120 corresponding to the meaning representation generated by the natural language interpreter 110 becomes "there is a nice restaurant named TGI".

The dialogue system 100 according to an embodiment may not only use the natural language generator 120 to generate an output sentence, but also use it to determine whether an input sentence is a sentence that cannot be processed by the dialogue system 100. That is, the dialogue system 100 according to an embodiment of the present disclosure may use the natural language generator 120 to detect Out of Domain (OOD).

If the input sentence corresponding to the user's speech is a request for a service that is not supported by the dialogue system 100 or the input sentence itself is meaningless, the input sentence may be considered to correspond to a sentence that cannot be processed by the dialogue system 100.

The determiner 130 of the dialogue system 100 according to an embodiment of the present disclosure calculates a parameter indicating a probability of outputting an input sentence when a meaning representation corresponding to an input sentence is input to the natural language generator 120, and determines whether an input sentence is a sentence that cannot be processed by the dialogue system 100, that is, whether the input sentence is an OOD sentence based on the calculated parameter.

Figure 5:
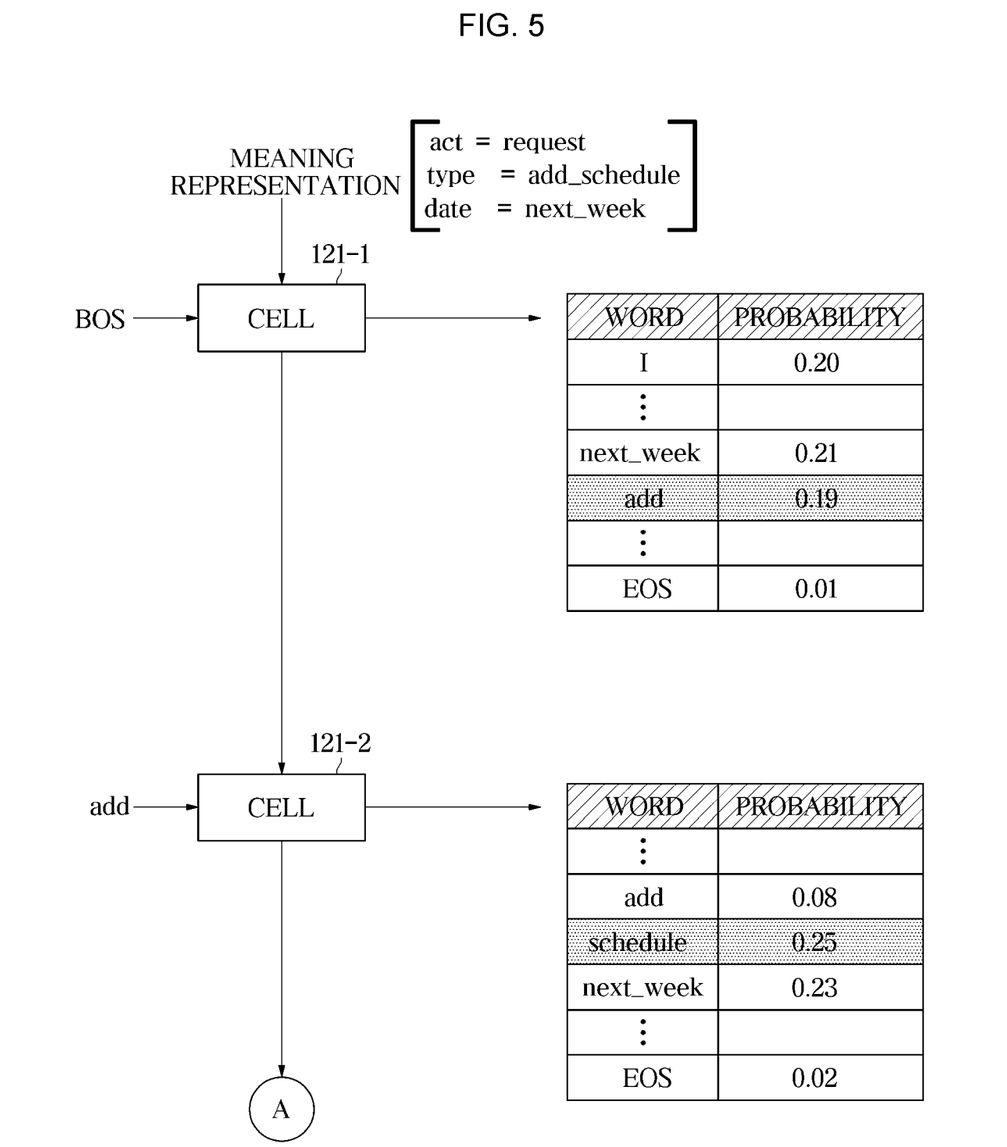
FIGS. 5 and 6 are diagrams illustrating a process in which the dialogue system according to an embodiment performs OOD detection using a natural language generator of the present disclosure.
Figure 6:
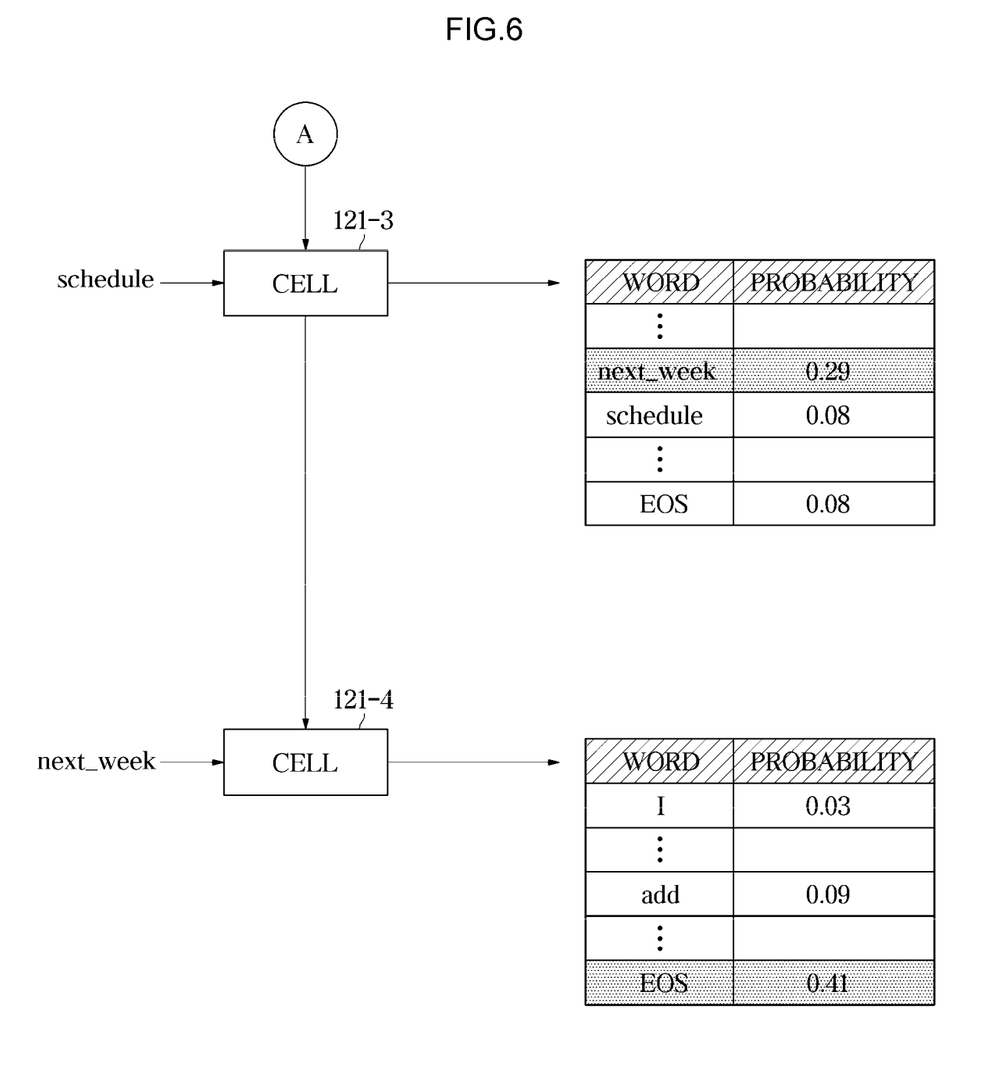

FIGS. 5 and 6 are diagrams illustrating a process in which the dialogue system according to an embodiment of the present disclosure performs OOD detection using a natural language generator.

In the examples of FIGS. 5 and 6, it is assumed that the user speech is "Add schedule next week".

When the input sentence "Add schedule next week" is entered from speech recognizer 140 or communicator 150, the natural language interpreter 110 may analyze the input sentence and generate a meaning representation [act: request/type: add_schedule/date: next week] as illustrated in FIG. 5.

Each of the plurality of cells 121 constituting the RNN-based natural language generator 120 generates a probability distribution for a plurality of pre-stored words in response to an input, and inputs a word included in the input sentence among the plurality of words into the next cell.

The determiner 130 may search for a word included in an input sentence from the generated probability distribution. Specifically, the determiner 130 searches for a word corresponding to the current time step among words included in the input sentence, and calculates a parameter indicating a probability of outputting an input sentence based on the output probability of the searched word.

Referring to FIG. 5, the meaning representation generated by the natural language interpreter 110 is input into the initial hidden layer of the natural language generator 120, and when a BOS for starting a sentence is input to the first cell 121-1, the first cell 121-1 may generate a probability distribution for a plurality of pre-stored words in response to the input.

The determiner 130 may search for a cell of the current time stage, that is, the first word "add" corresponding to the first cell 121-1, among words included in the input sentence from the generated probability distribution, and may store the output probability of the searched "add".

As described above, when generating an output sentence for a system response, a word having the highest output probability is input to the next cell, but when OOD is detected, words included in the input sentence may be sequentially input to the next cell.

Therefore, the first word of the input sentence "add" can be input into the second cell 121-2, and the second cell 121-2 generates a probability distribution for a plurality of words in response to the input.

The determiner 130 may search for the second word "schedule" among words included in the input sentence from the generated probability distribution, and may store the output probability of the searched "schedule".

Referring to FIG. 6, the second word of the input sentence "schedule" may be input to the third cell 121-3, and the third cell 121-3 may generate a probability distribution for a plurality of words in response to the input.

The determiner 130 may search for "next week", which is a third word among words included in the input sentence, from the generated probability distribution, and store the output probability of the searched "next week".

The third word "next week" of the input sentence may be input into the fourth cell 121-4, and the fourth cell 121-4 may generate a probability distribution for a plurality of words in response to the input have.

The determiner 130 may search for EOS for ending a sentence from the generated probability distribution, and may store the output probability of the searched EOS.

When generation of the output sentence is finished, the determiner 130 may determine whether the input sentence is a sentence that cannot be processed based on the stored output probability. For example, an average value of the output probability of each word constituting the input sentence may be calculated as a parameter indicating the probability of outputting the input sentence.

The determiner 130 may determine that the input sentence is a sentence that can be processed by the dialogue system 100, which is an in-domain sentence, if the average value of the output probability of each word constituting the input sentence is more than a predetermined reference value. Conversely, if the average value of the output probability of each word constituting the input sentence is less than a predetermined reference value, it may be determined that the input sentence is a sentence that cannot be processed by the dialogue system 100, which is an OOD sentence.

In the above example, a case in which the plurality of cells 121 constituting the natural language generator 120 generates a probability distribution for a plurality of pre-stored words has been described. However, it is also possible to generate a ranking distribution for a plurality of pre-stored words.

Even when the rank distribution is used, the determiner 130 may calculate a parameter indicating a probability of outputting an input sentence based on an output ranking of words included in the input sentence in the ranking distribution for a plurality of words. The determiner 130 determines that the input sentence is a sentence that can be processed by the dialogue system 100 if the calculated parameter is more than a predetermined reference value, and determines that the input sentence is a sentence that cannot be processed by the dialogue system 100 if the determiner 130 is less than a predetermined reference value.

The natural language generator 120 is a model generated by learning in-domain sentences. Accordingly, as described above, when the natural language generator 120 is used, it is possible to perform OOD detection using the learning result of the in-domain sentence without building a learning database by collecting separate OOD sentences.

Figure 7:
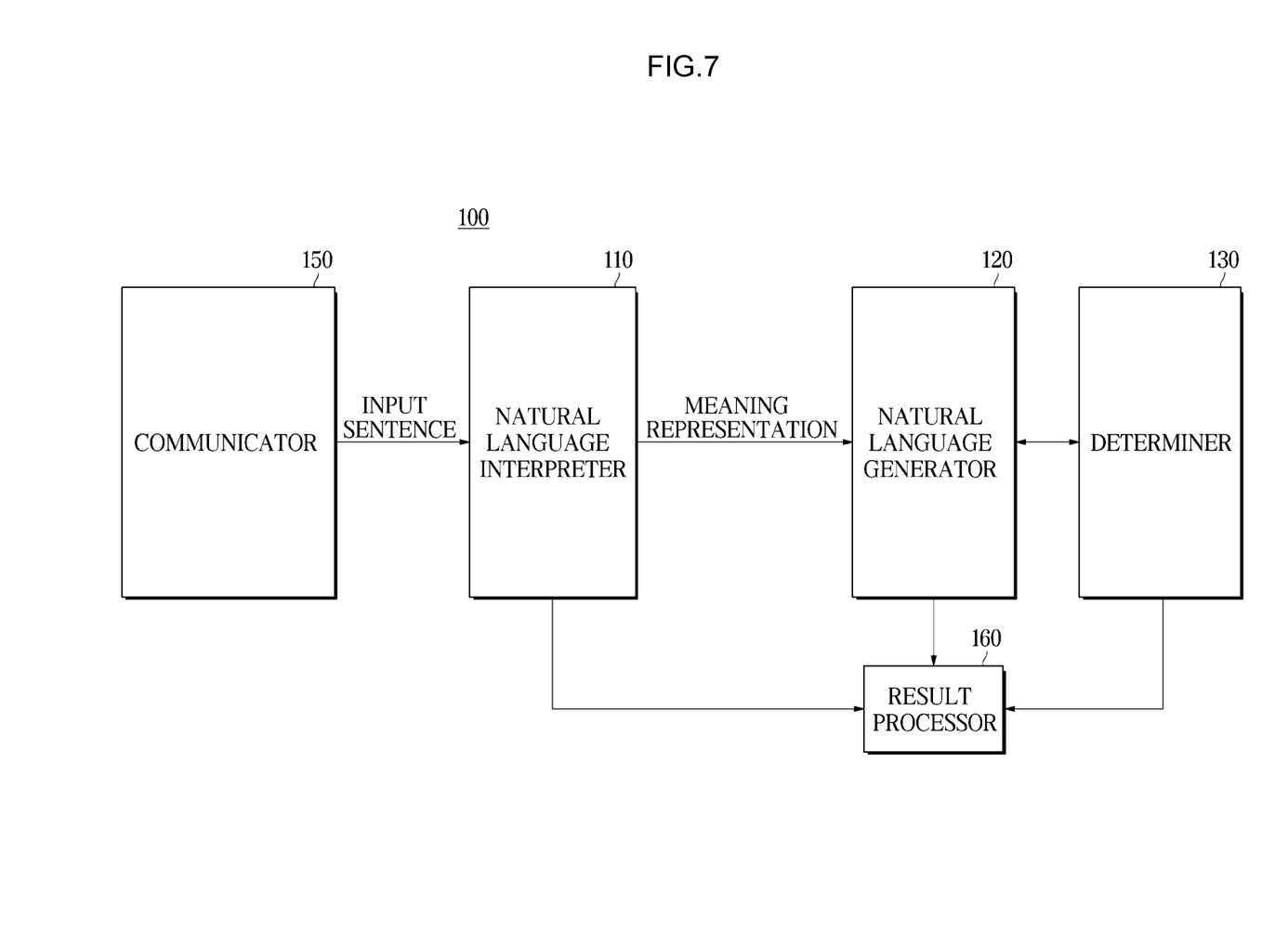
FIG. 7 is a control block diagram of a dialogue system further including a result processor according to an embodiment of the present disclosure.

FIG. 7 is a control block diagram of a dialogue system further including a result processor according to an embodiment of the present disclosure.

Referring to FIG. 7, the dialogue system 100 according to an embodiment of the present disclosure may further include a result processor 160 processing the natural language understanding result of the natural language interpreter 110 further in the natural language generation result of the natural language generator 120 and the OOD detection result of the determiner 130.

When the determiner 130 determines that the input sentence is a sentence that can be processed by the dialogue system (100), the natural language generator 120 may generate an output sentence as a system response to a user speech. In this case, the meaning representation corresponding to the input sentence is input to the natural language generator 120 as in the case of OOD detection, the word input from the cell of the current time step to the cell of the next time step is not a word included in the input sentence, but a word having the highest output probability or output ranking in a probability distribution or ranking distribution.

When the natural language generator 120 generates an output sentence, the text-to-speech (TTS) engine of the result processor 160 converts the output sentence in text form into an audio signal and transmits it to the user terminal through the communicator 150. The transmitted voice signal may be output through a speaker provided in the user terminal.

In addition, the result processor 160 may generate a control signal or a request signal for performing a function corresponding to the user's intention analyzed by the natural language interpreter 110. For example, if the user's intention is related to control of a home appliance or vehicle, a control signal for performing a control corresponding to the user's intention may be generated. The generated control signal may be transmitted to a home appliance or vehicle through the communicator 150.

Alternatively, if the user's intention is a request for specific information, a request signal for requesting it to an external server that provides the information may be generated. The generated request signal may be transmitted to an external server through the communicator 150.

If the determiner 130 determines that the input sentence is a sentence that cannot be processed by the dialogue system 100, the result processor 160 may output a guide indicating that the user's speech cannot be processed. To this end, an output sentence for guidance may be generated by the natural language generator 120 or imported from a sentence database stored in the result processor 160.

The output sentence for guidance may be converted into a voice signal in the TTS engine, and the converted voice signal may be transmitted to the user terminal through the communicator 150.

Hereinafter, an embodiment of a method for controlling a dialogue system will be described. In implementing the dialogue system control method, the dialogue system (1) described above can be used. Accordingly, the contents described above with reference to FIGS. 1 to 7 may be equally applied to a method of controlling a dialogue system even if there is no separate mention.

Figure 8:
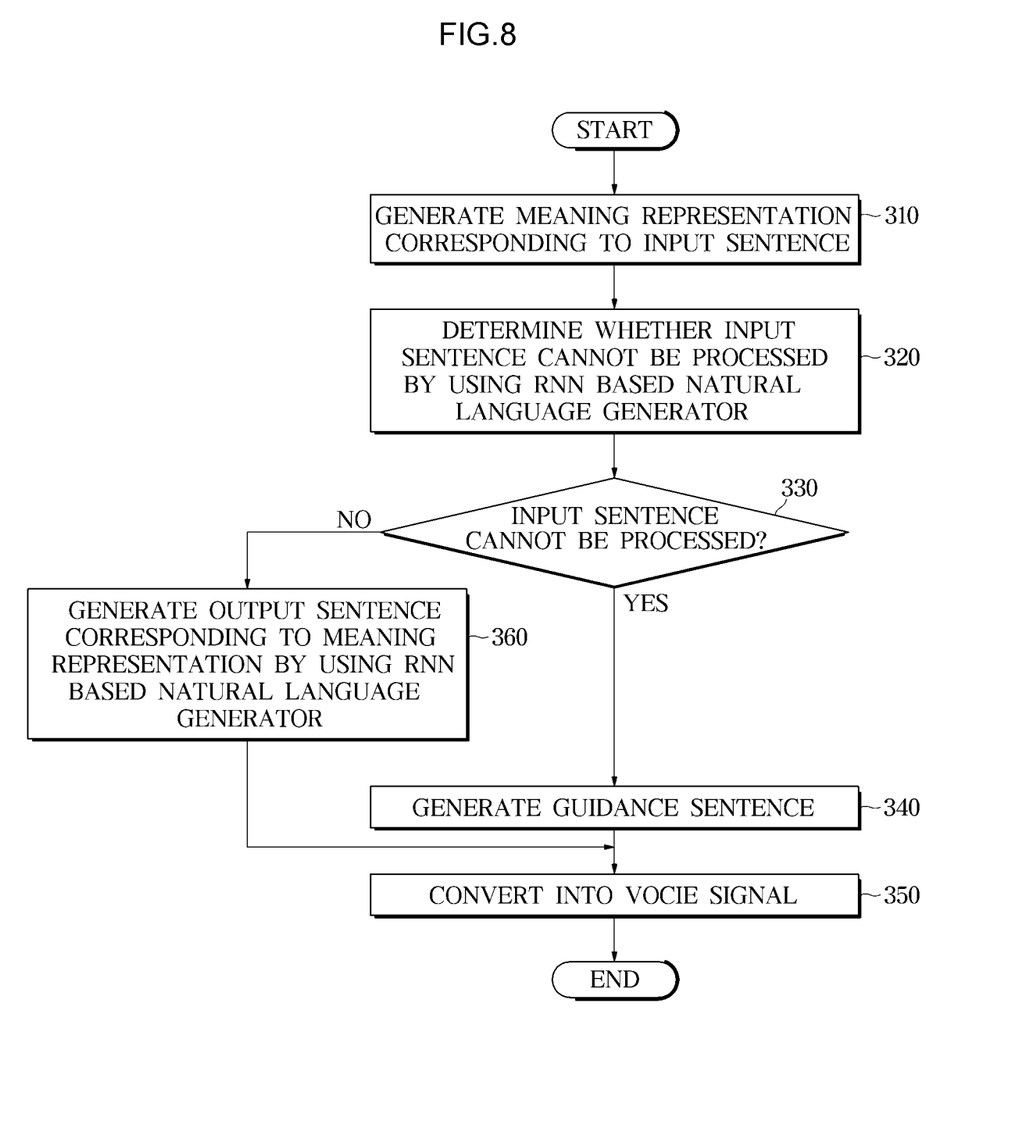
FIG. 8 is a flowchart of a method for controlling a dialogue system according to an embodiment of the present disclosure.

FIG. 8 is a flowchart of a method for controlling a dialogue system according to an embodiment of the present disclosure.

According to the control method of the dialogue system shown in FIG. 8, first, a meaning representation corresponding to an input sentence is generated (310). The input sentence is a result of converting the user's speech into text by performing speech recognition, when the speech recognizer 140 is provided in the dialogue system 100, the input sentence output from the speech recognizer 140 may be input to the natural language interpreter 110, and when the speech recognizer 140 is not provided in the dialogue system 100 and the speech recognizer 140 is provided in the user terminal, the communicator 150 of the dialogue system 100 may receive an input sentence transmitted from the user terminal.

The meaning representation is a result of the natural language interpreter 110 analyzing the input sentence by performing natural language understanding, and may be a set of various meaning representation tags. The description of the meaning representation is as described above.

It is determined whether the input sentence is a sentence that cannot be processed using an RNN-based natural language generator (320). The natural language generator 110 of the dialogue system 100 may generate an output sentence corresponding to the meaning representation using an RNN that has learned in-domain sentences. In a method of controlling a dialogue system according to an embodiment of the present disclosure, not only an output sentence is generated using the RNN-based natural language generator 110, but also OOD detection, which is a determination of whether an input sentence can be processed, may be performed. A detailed description of this will be described later.

As a result of the determination, if the input sentence is a sentence that cannot be processed (YES in 330), a guidance sentence for outputting a guidance indicating that the user's speech cannot be processed may be generated (340). Guidance sentences may be generated by the natural language generator 120 or may be imported from the sentence database stored in the result processor 160.

The guidance sentence is converted into a voice signal in the TTS engine (350), and the converted voice signal may be transmitted to the user terminal through the communicator 150.

As a result of the determination, if the input sentence is a processable sentence (No of 330), an output sentence corresponding to a meaning representation is generated (360) using an RNN-based natural language generator, and the output sentence is converted into a voice signal (350), and then transmitted to a user terminal through a communicator 150. When generating the output sentence corresponding to the meaning representation, like when OOD is detected, meaning representation corresponding to the input sentence is input to the natural language generator 120, the word input from the cell of the current time step to the cell of the next time step is not a word included in the input sentence, but a word having the highest output probability or output ranking in a probability distribution or ranking distribution.

In addition, when the input sentence is a processable sentence (No in 330), it is possible to generate a control signal or a request signal for performing a function corresponding to the user's intention analyzed by the natural language interpreter 110. For example, if the user's intention is related to control of a home appliance or vehicle, a control signal for performing a control corresponding to the user's intention may be generated. The generated control signal may be transmitted to a home appliance or vehicle through the communicator 150.

Alternatively, if the user's intention is a request for specific information, a request signal for requesting it to an external server that provides the information may be generated. The generated request signal may be transmitted to an external server through the communicator 150.

Figure 9:
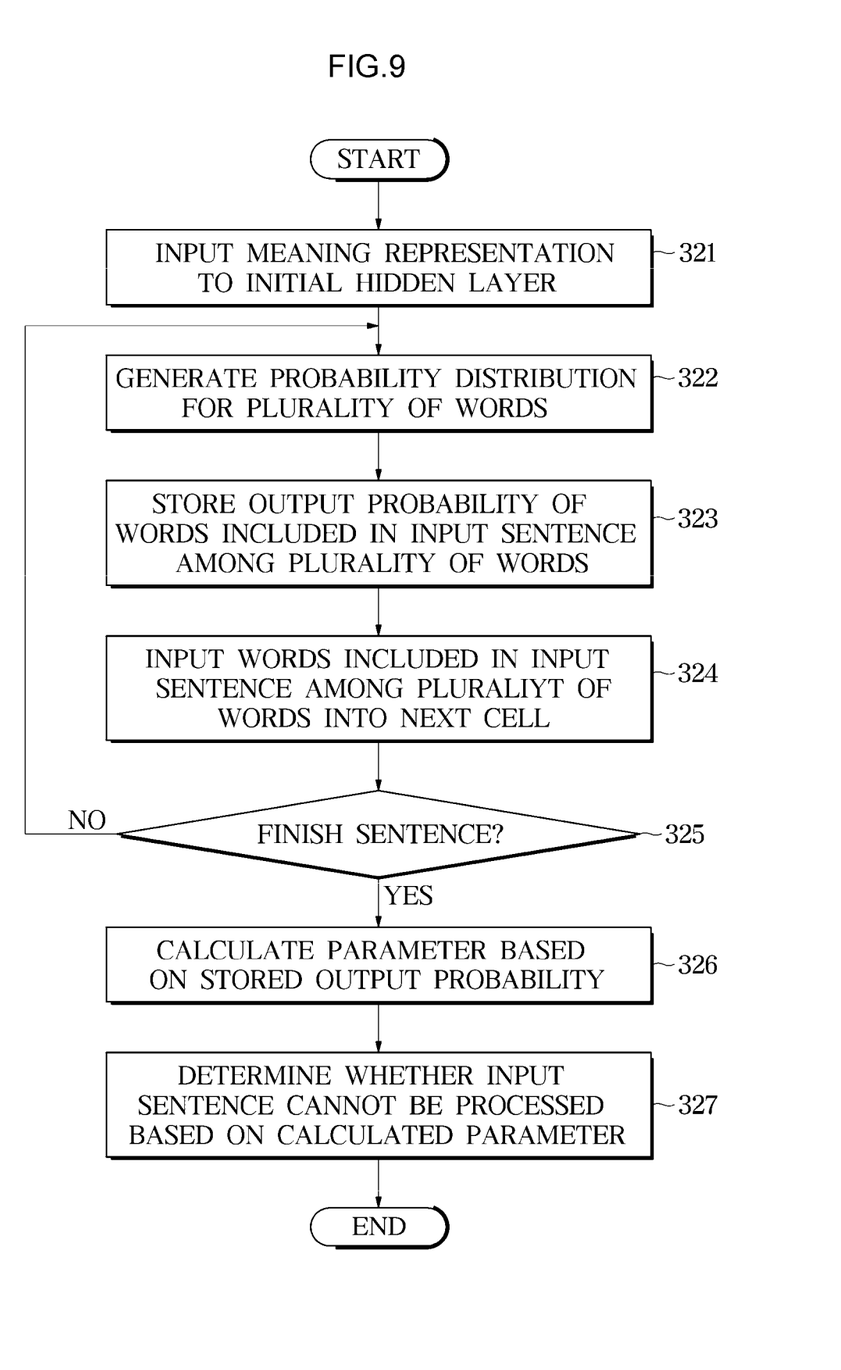
FIG. 9 is a flowchart illustrating a process of determining whether an input sentence is a sentence that cannot be processed in a method of controlling a dialogue system according to an exemplary embodiment of the present disclosure.

FIG. 9 is a flowchart illustrating a process of determining whether an input sentence is a sentence that cannot be processed in a method of controlling a dialogue system according to an exemplary embodiment of the present disclosure. In this example, it is assumed that the RNN-based natural language generator 120 includes a plurality of cells 121 according to the structures of FIGS. 4 to 6 described above.

Referring to FIG. 9, a semantic expression generated through natural language understanding is input to an initial hidden layer of the natural language generator 120 (321).

The cell of the current time step generates a probability distribution for a plurality of pre-stored words in response to an input (322), and stores an output probability of a word included in the input sentence among the plurality of words (323). Here, the word in which the output probability is stored is a word corresponding to the current time step among words included in the input sentence.

Among the plurality of words, a word included in the input sentence is input into the next cell (324). When generating the output sentence corresponding to the meaning representation, the word with the highest output probability is entered into the cell of the next time step, and when OOD is detected words included in the input sentence, among others, a word corresponding to the current time step may be input to the cell of the next time step.

The above-described process is repeated until the sentence is finished. When the sentence ends (Yes in 325), a parameter is calculated based on the stored output probability (326). For example, an average value of the output probability of each word constituting the input sentence may be calculated as a parameter indicating the probability of outputting the input sentence.

It is determined whether the input sentence is a sentence that cannot be processed based on the calculated parameter (327). For example, if the average value of the output probability of each word constituting the input sentence is equal to or greater than a predetermined reference value, it may be determined that the input sentence is an in-domain sentence, that is, a sentence that can be processed by the dialogue system 100. Conversely, if the average value of the output probability of each word constituting the input sentence is less than a predetermined reference value, it may be determined that the input sentence is an OOD sentence, that is, a sentence that cannot be processed by the dialogue system 100.

In the above example, a case in which the plurality of cells 121 constituting the natural language generator 120 generates a probability distribution for a plurality of pre-stored words has been described. It is also possible to generate a ranking distribution for a plurality of pre-stored words.

Specifically, each of the plurality of cells 121 corresponds to an input, a ranking distribution for a plurality of pre-stored words may be generated, and a word included in an input sentence among the plurality of words, particularly a word corresponding to a current time step, may be input into the next cell.

Even when the rank distribution is used, the determiner 130 may calculate a parameter indicating a probability of outputting an input sentence based on an output ranking of words included in the input sentence in the ranking distribution for a plurality of words. The determiner 130 may determine that the input sentence is a sentence that can be processed by the dialogue system 100 if the calculated parameter is more than a predetermined reference value, and may determine that the input sentence is a sentence that cannot be processed by the dialogue system 100 if it is less than the predetermined reference value.

According to the dialogue system and its control method described so far, without establishing a separate database for OOD detection, by performing OOD detection using an RNN-based natural language generator, it is possible to accurately detect OOD sentences with little time and cost.

As described above, the disclosed embodiments have been described with reference to the accompanying drawings. Those of ordinary skill in the art to which the present disclosure pertains will understand that the present disclosure may be practiced in a form different from the disclosed embodiments without changing the technical spirit or essential features of the present disclosure. The disclosed embodiments are exemplary and should not be construed as limiting.

According to the dialogue system and its control method according to an aspect, by performing OOD detection using a natural language generator that generates a system response to a user's speech, service quality can be improved at a low cost without additional OOD data construction.

What is claimed is:

1. A dialogue system comprising a processor including a plurality of cells,
   wherein each of the plurality of cells generates a probability distribution for a plurality of pre-stored words, and inputs a word included in an input sentence among the plurality of pre-stored words into a next cell in response to an input, and the plurality of cells output words corresponding to an input meaning representation, and
   wherein the processor is configured to:
   generate a meaning representation corresponding to an input sentence by performing Natural Language Understanding on the input sentence,
   generate an output sentence corresponding to the input meaning representation based on Recurrent Neural network (RNN),
   determine whether the input sentence cannot be processed,
   calculate a parameter representing a probability of outputting the input sentence when the meaning representation corresponding to the input sentence is input, where the processor calculates the parameter based on an output probability of the word included in the input sentence from the generated probability distribution, and
   determine whether the input sentence cannot be processed based on the calculated parameter.

2. The dialogue system of claim 1, wherein each of the plurality of cells generates a ranking distribution for the plurality of pre-stored words and inputs the word included in the input sentence among the plurality of pre-stored words into the next cell in response to the input.

3. The dialogue system of claim 2, wherein the processor calculates the parameter based on a ranking of words included in the input sentence in the generated ranking distribution.

4. The dialogue system of claim 2, wherein the processor determines that the input sentence cannot be processed when the parameter is less than a reference value.

5. The dialogue system of claim 4, wherein the input sentence that cannot be processed is an Out-of-domain (OOD) sentence.

6. The dialogue system of claim 1, wherein each of the plurality of cells generates the probability distribution or rank distribution for the plurality of pre-stored words, and inputs the word having a highest output probability or output priority among the plurality of pre-stored words into the next cell in response to input when the input sentence can be processed.

7. The dialogue system of claim 6, wherein the processor generates the output sentence consisting of words output from each of the plurality of cells.

8. A controlling method of a dialogue system, the method comprising:
   generating a meaning representation corresponding to an input sentence by performing Natural Language Understanding on the input sentence; and
   determining whether the input sentence cannot be processed using a processor which generates an output sentence corresponding to the input meaning representation based on Recurrent Neural network (RNN),
   wherein the processor includes a plurality of cells outputting words corresponding to the input meaning representation, and
   wherein the determining whether the input sentence cannot be processed includes:

generating a probability distribution for a plurality of pre-stored words, inputting a word included in the input sentence among the plurality of pre-stored words into a next cell in response to the inputting of the word, calculating a parameter representing a probability of outputting the input sentence when the meaning representation corresponding to the input sentence is input, where the parameter is calculated based on an output probability of the word included in the input sentence from the generated probability distribution, and determining whether the input sentence cannot be processed based on the calculated parameter.

9. The method according to claim 8, wherein the determining whether the input sentence cannot be processed includes:

generating a ranking distribution for the plurality of pre-stored words in response to the input by the each of the plurality of cells, and inputting the word included in the input sentence among the plurality of pre-stored words into the next cell in response to the input.

10. The method according to claim 9, wherein the determining whether the input sentence cannot be processed includes calculating the parameter based on a ranking of words included in the input sentence in the generated ranking distribution.

11. The method according to claim 8, wherein the determining whether the input sentence cannot be processed includes determining that the input sentence cannot be processed when the parameter is less than a reference value.

12. The method according to claim 11, wherein the input sentence that cannot be processed is an Out-of-domain (OOD) sentence.

13. The method according to claim 8, further comprising:

generating the probability distribution or rank distribution for the plurality of pre-stored words by each of the plurality of cells, and inputting the word having a highest output probability or output priority among the plurality of pre-stored words into the next cell in response to input upon determining that the input sentence can be processed.

14. The method according to claim 13, further comprising generating the output sentence consisting of words output from each of the plurality of cells with the highest output probability or a highest output rank upon determining that the input sentence can be processed.

* * * * *